UNITED STATES PATENT OFFICE.

ROBERT SENGER, OF NEW YORK, N. Y.

INDULINE DYE.

SPECIFICATION forming part of Letters Patent No. 475,616, dated May 24, 1892.

Application filed November 21, 1891. Serial No. 412,661. (Specimens.)

*To all whom it may concern:*

Be it known that I, ROBERT SENGER, a citizen of the United States, residing at New York, in the county and State of New York, have invented new and useful Improvements in Dyeing Compounds and the Process for Making the Same, of which the following is a specification.

I have discovered that by combining three molecules of a fatty acid—such as oleic acid, stearic acid, or palmetic acid—with one molecule of a basic coal-tar dye—such as induline—a dye compound is obtained which is easily soluble in the volatile constituents of coal-tar and of petroleum and which will readily combine with animal fiber—such, for instance, as leather.

The following is an example in which my invention may be carried out in practice: I take the base of induline, ($C_{18}H_{16}N_3HO$,) the molecular weight of which is two hundred and ninety-one, and combine with the same oleic acid, ($C_{18}H_{34}O_2$,) molecular weight two hundred and eighty-two, in the proportion of three molecules of acid to one of base—that is to say, two hundred and ninety-one parts, by weight, of induline base are mixed with eight hundred and forty-six parts, by weight, of oleic acid—and the mixture is heated for about four hours to about 100° to 120° centigrade until no more solid particles are discernible in the mixture.

Instead of oleic acid I can use stearic acid or palmetic acid, as above stated. It is well known that one molecule of oleic acid forms a salt with the base of induline; but this compound is almost insoluble in cold benzine, and if it is treated with boiling benzine and left to cool almost all of the induline is precipitated, not leaving enough to make a solution serviceable for dyeing.

My new dye-stuff (trioleate of induline) is a liquid at the ordinary temperature of the consistency of castor-oil, appearing intensely black, insoluble in water, easily soluble in alcohol, benzine, paraffine, vegetable and animal oils, and it is easily fixed on animal fiber.

What I claim is—

1. As a new article of manufacture, the black dye-stuff (trioleate of induline) which has the following characteristics: it is an intensely-black liquid which at the ordinary temperature has the consistency of castor-oil, insoluble in water, but easily soluble in alcohol and in benzine.

2. The within-described process for preparing the new dye-stuff, (trioleate of induline,) which consists in mixing one molecule of induline with three molecules of oleic acid and then heating the mixture to about 100° to 120° centigrade, substantially as described.

In testimony whereof I have hereunto set my hand in the presence of two subscribing witnesses.

ROBERT SENGER.

Witnesses:
  WM. C. HAUFF,
  E. F. KASTENHUBER.